(12) United States Patent
Jensen et al.

(10) Patent No.: US 7,463,726 B2
(45) Date of Patent: Dec. 9, 2008

(54) REMOTELY SELECTING AN ECONOMICAL COMMUNICATIONS TRANSMISSION MEDIUM

(75) Inventors: Mark C. Jensen, Morgan Hill, CA (US); Ronald E. Anglikowski, Morgan Hill, CA (US); Thomas J. Beck, Morgan Hill, CA (US); Seck Aik Foo, Newark, CA (US)

(73) Assignee: SparkTech Corporation

( * ) Notice: Subject to any disclaimer, the term of this patent is extended or adjusted under 35 U.S.C. 154(b) by 0 days.

(21) Appl. No.: 10/356,769

(22) Filed: Feb. 3, 2003

(65) Prior Publication Data
US 2004/0151293 A1    Aug. 5, 2004

(51) Int. Cl.
*H04M 15/00* (2006.01)
*H04M 11/00* (2006.01)
*H04M 1/00* (2006.01)

(52) U.S. Cl. .................... 379/114.02; 379/114.01; 379/127.05; 455/406; 455/552.1; 455/554.2

(58) Field of Classification Search ............. 379/114.01, 379/114.02, 114.21, 114.22, 127.05, 373.01, 379/373.02; 455/405, 406, 74.1, 552.1, 554.2, 455/557
See application file for complete search history.

(56) References Cited

U.S. PATENT DOCUMENTS

| | | | | |
|---|---|---|---|---|
| 5,404,579 A * | 4/1995 | Obayashi et al. | ............... | 455/74 |
| 5,471,522 A * | 11/1995 | Sells et al. | ............... | 379/93.11 |
| 5,526,403 A * | 6/1996 | Tam | ........................ | 455/426.1 |
| 5,832,378 A * | 11/1998 | Zicker et al. | ............. | 455/552.1 |
| 5,911,123 A * | 6/1999 | Shaffer et al. | ............ | 455/554.1 |
| 6,263,057 B1 * | 7/2001 | Silverman | ............... | 379/114.02 |
| 6,343,220 B1 * | 1/2002 | Van Der Salm | .......... | 455/552.1 |
| 6,366,560 B1 * | 4/2002 | Ohiwane et al. | ............ | 370/238 |
| 6,704,580 B1 * | 3/2004 | Fintel | ....................... | 455/550.1 |
| 6,741,870 B1 * | 5/2004 | Holmstrom et al. | ............ | 455/557 |
| 6,775,522 B2 * | 8/2004 | Schornack et al. | ......... | 455/74.1 |
| 6,804,536 B1 * | 10/2004 | Bultman | ..................... | 455/557 |
| 6,987,988 B2 * | 1/2006 | Uchiyama | ................... | 455/557 |

* cited by examiner

*Primary Examiner*—Quoc D Tran
(74) *Attorney, Agent, or Firm*—David Lewis

(57) ABSTRACT

A method and apparatus for enabling a user to remotely select which communications device to use for a particular communications session from among a plurality of communication devices connected to standard residential telephone wiring. The user enters a predetermined signal from any of the devices connected to the residential wiring. The method of the present invention analyzes the signal and, depending on the state of a number of variables related to cost effective operation, selects which of the devices is the most economical for a particular communications session.

18 Claims, 10 Drawing Sheets

REMOTELY SELECTING AN ECONOMICAL COMMUNICATIONS TRANSMISSION MEDIUM

BRIEF DESCRIPTION

The subject of the present invention relates to the telephony industry. Specifically, the present invention discloses a method and apparatus for providing the ability to remotely select the most economical telephone device to use for a user who has multiple devices sharing the telephone wiring in a residence. Which of the devices selected depends on a number of factors such as time of day, per minute charges and signal strength.

BACKGROUND OF THE INVENTION

Modern residential telephones, sometimes referred to as "plain old telephones" [POTs], operate over wires running throughout the house. Most modern systems operate over two twisted pairs of wires connected to a jack mounted in the wall. These wires are generally called the primary and secondary circuits. The primary circuit is referred to as Line 1, while the secondary circuit is referred to as Line 2. Also generally, the red and green pair form the Line 1 circuit and the yellow and black pair form the Line 2 circuit.

All POTs devices in the residence are typically connected in parallel to the Line 1 circuit. Thus, if a phone call arrives, any POTs device in the residence may be taken off hook and the call answered. Conversely, a user may use any of the devices located throughout the residence to initiate a call. However, in many residences the Line 2 pair is used as well. For example, the Line 2 pair may be used for a second telephone number needed for FAX or Internet connection. If the Line 2 pair is not used, it remains free for use by other devices.

Advances in telephony systems and services include cellular wireless services, or the so-called cell phone service. A cell phone is a line-of-sight radio device that communicates with a matrix of radio transceivers, called cells. These cell sites in turn connect to a central office [CO] allowing a cellular call to be sent and/or received over standard telephone wires. Increasingly, consumers are using cell phone interface appliances in their residences allowing the cell phone to be connected as another residential telephone communications device. This is accomplished by connecting the cell phone to the residential wiring using a cell phone base station. In this way the residential user can increase the flexibility of their home communications system without having to invest in additional equipment.

One important reason that users are electing to use their cell phones in their residence is economic. Current CO telephone providers must cover their operational costs by charging certain per minute rates to their customers. Local calls are usually provided at no cost above the monthly service charge; however, long distance rates vary dramatically. With the proliferation of area codes, calls that have historically been local are now considered long distance. This has led to increased per minute user charges. Cell service providers also cover their costs by charging monthly rates, but many of these providers offer very low cost airtime during "off peak" hours, typically after 8:00 PM and on weekends. Many cell phone service providers also offer free long distance and free minutes during these periods, making the cell phone a superior economic choice for the consumer. As a result, a number of methods have emerged that allow cell phone users to connect their cell phones to their residential wiring.

Some of the devices used to connect cell phones to residential wiring use the Line 1 circuit. To accomplish this, each of the POTs phones in the residence must be isolated if the cell phone is going to be used. This is so since the cell phone and the POTs phones are not compatible. While this method works, it is cumbersome and mandates that the user physically disconnect one or the other of the device types to realize the advantage of cheaper rates.

Other methods use the Line 2 circuit, or the yellow and black pair, if it is available. The cell phone base station is connected to the Line 2 circuit using the same RJ-11 wall jack as is used by the standard POTs devices. However, these devices suffer from a number of problems. First, the majority of these devices are mono-directional. That is, the cell phone may only be used to receive a call. Where the device is bidirectional, the user must physically switch the Line 2 circuit to the Line 1 circuit. This is so for the same reason discussed above. Thus if a user is in the upstairs den and wishes to use the cell phone to initiate a call, and if the cell phone base station is downstairs in the kitchen, he/she must first trundle down the stairs to the kitchen to make the change.

As can be seen, current methods for providing residential cell phone connection suffer from a number of disadvantages. What is needed is a method that combines the ability to both initiate and receive calls without the need to physically switch the device connected to the residence wiring. A user could then efficiently manage his/her calling costs by selecting the most cost effective device for a particular communications session from a remote location. It would be further advantageous to provide a method that kept track of certain variables related to calling costs such as time of day, available low cost minutes, and signal strength such that the most cost effective telephone device is automatically selected for the user.

SUMMARY OF THE INVENTION

A method and apparatus for enabling a user to remotely select which communications device to use for a particular communications session from among a plurality of communication devices connected to standard residential telephone wiring. The user enters a predetermined signal from any of the devices connected to the residential wiring. The method of the present invention analyzes the signal and, depending on the state of a number of variables related to cost effective operation, selects which of the devices is the most economical for a particular communications session.

To accommodate both cellular telephone devices and standard POTs devices, a circuit transposing device is inserted between each POTs telephone and the residential wiring such that each of the POTs devices now attaches to the Line 2 circuit. A cellular base station is connected to both Line 1 and Line 2 circuits and includes a remotely actuated switch. When a user desires to initiate a call, a preprogrammed signal is sent to the cellular base station from any Dual Tone Multi Frequency [DTMF] device in the residence. Upon receiving this signal, and depending upon the state of the residential communications system, the base station switches the Line 1 and Line 2 circuits.

The cellular base station contains a microprocessor with a memory and related hardware and software. This allows certain data related to economic operation of the residential communications system to be stored and analyzed each time a communications session occurs. Such data as the time-of-day, per minute billing rates for various service providers, available low cost minutes and signal quality can be accessed and analyzed to determine which of a plurality of communications devices is the most economical for a particular communications session.

As can be seen, the method of the present invention allows a user to remotely activate a process which selects which communications device to use in order to attain the most economical communication session without the disadvantages of the prior art devices. This and other features and advantages of the present invention are discussed in detail below in conjunction with the drawings and figures attached.

DETAILED DESCRIPTION OF PREFERRED EMBODIMENTS

As described briefly above, there are a number of disadvantages with the current methods for users to select which of a plurality of communications devices to use in order to achieve the most economic result for a particular communications session. Primary among these are the need to physically switch from one device type to another and lack of bidirectional communication. Use of the method of the present invention overcomes these and other disadvantages as will be understood from the detailed discussion below.

Figure 1:
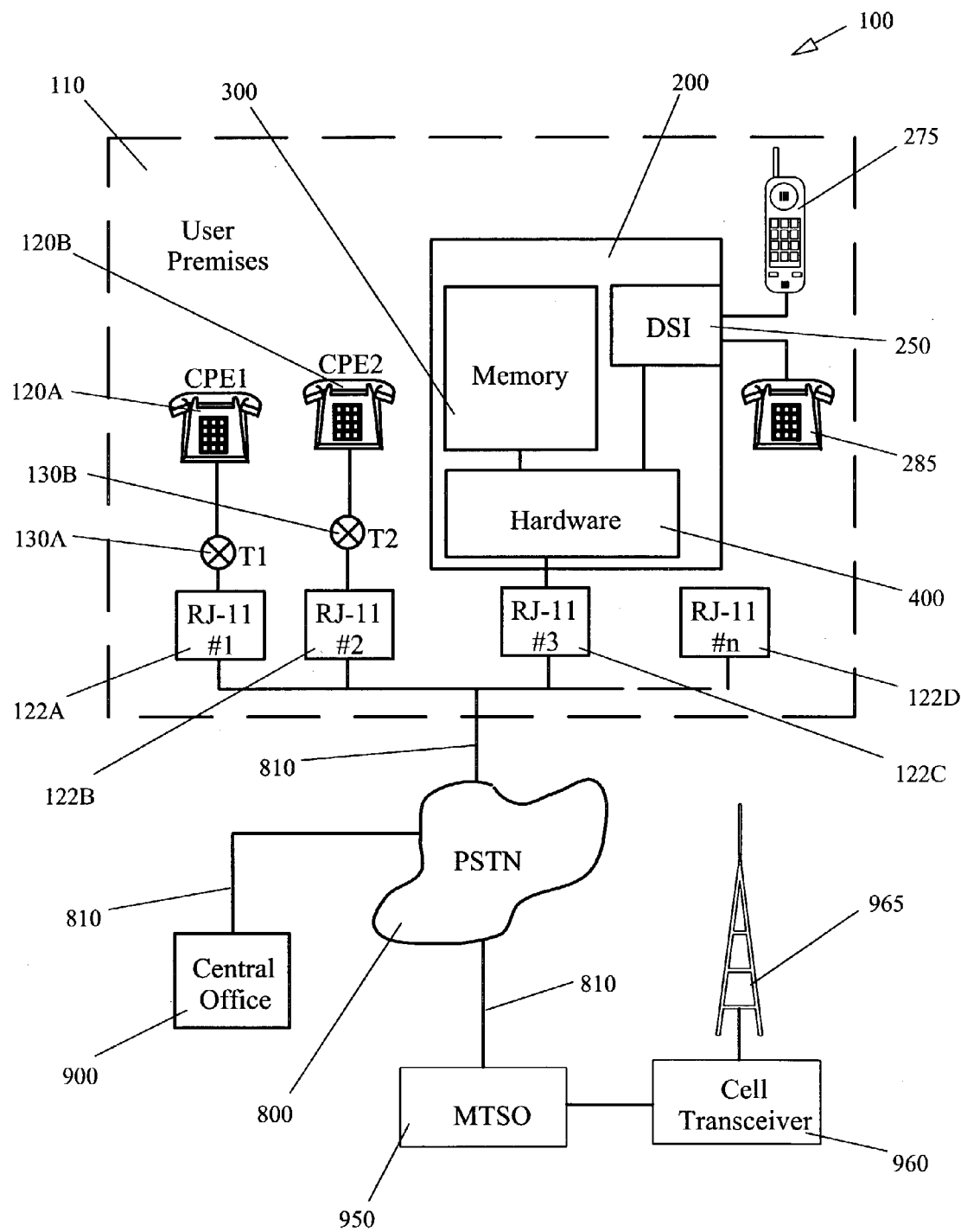
FIG. 1: is a network diagram of a system which can make use of the method of the present invention.

For a more complete understanding of the method of the present invention, it is helpful to first describe the environment in which the invention operates. Referring to FIG. 1, a high-level block diagram 100 of a typical communications system that can make use of the method of the present invention is shown.

A user premises 110 contains internal telephone wiring running throughout the house. These wires contain the Line1/Line2 pairs and terminate at various points with a female RJ-11 jack, for example, RJ-11 122A, 122B, 122C and 122D. Each of these RJ-11 jacks shares a common connection to the Public Switched Telephone Network [PSTN] 800 via lines 810. The open end of each of the RJ-11 jacks is available for attachment to a telephony device such as POTs devices CPE1 120A and CPE2 120B or a cell phone base station 200. However, for the method of the present invention to operate properly, a Line1/Line2 transposer is needed for each POTs device attached to the residential communications wiring. Thus transposers T1 130A and T2 130B appear between CPE1 120A and CPE 2 120B respectively. Note that each of the RJ-11 connectors and transposers is identical, and all operate in the same fashion. For the balance of the detailed discussion of the method of the present invention only CPE1 120A, transposer T1 130A and RJ-11 122A will be discussed, however it will be understood that the discussion applies to all other like devices.

Also connected to the PSTN 800 in FIG. 1 is a Central Office [CO] 900. The CO 900 provides standard telephone service to the user premises 110 and connects to the PSTN 800 via the same wiring 810 as is connected to the user premises. Cell phones are able to communicate over the wiring 810 since they are routed through a Mobile Telephone Switching Office [MTSO] 950. There exist a plurality of MTSOs located at geographically disparate locations, each consolidating a number of cell tranceivers such as Cell Transceiver 960. Thus when a third party calls the user premises using a cell phone, the cell call is received by antenna 965, routed via Cell Transceiver 960 to MTSO 950, and then to the CO 900 via wiring 810 and the PSTN 800. At the CO 900, the call is routed to the proper destination, for example, to user premises 110.

Turning now to cell base station 200 located in user premises 110, as can be seen, a cell phone 275 is attached to Dual System Interface [DSI] 250. Also connected to the DSI 250 is Auxilliary POTs device [Aux POTs] 285. Each of the components of the DSI 250 is discussed in detail below in conjunction with FIG. 3.

Cell phone base station 200 further contains Hardware 400 and Memory 300. Memory 300 further contains Digital Integrated Answering Software [DIAS] 340, Switch Logic 330, Call Manager 320, and Control Software 310. As will be discussed below, DIAS 340 performs a number of functions, but generally serves as the answering machine. Switch Logic 330 is responsible for analyzing the variables associated with the economic communications session decision. Call Manager 320 works in conjunction with Switch Logic 330 to monitor the status of the residential communications system and related data. The Control Software 310 accomplishes the general timing and administrative tasks associated with a contemporary digital device. Each of these main modules is discussed in detail below in conjunction with FIG. 5.

Figure 2:
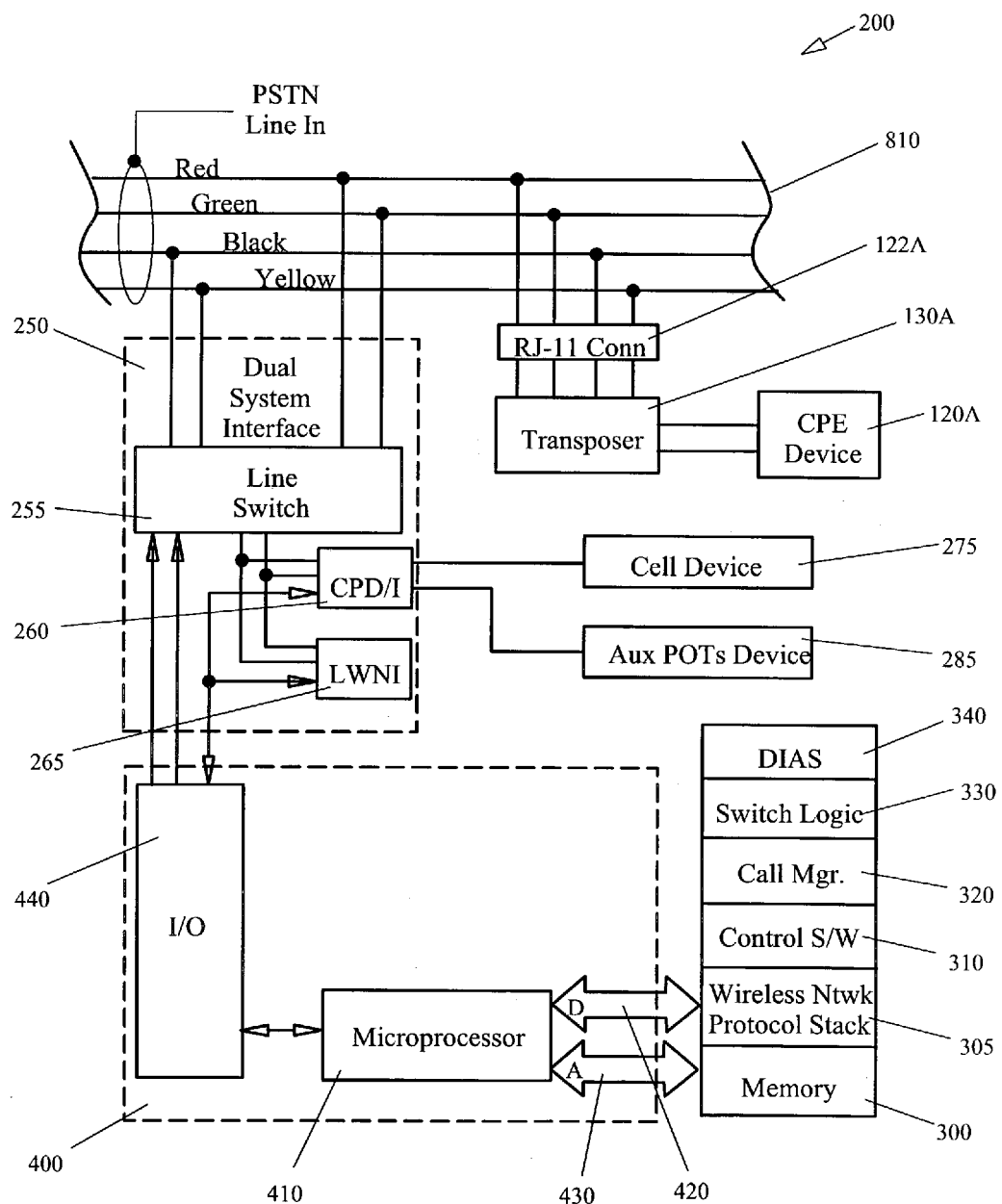
FIG. 2: is a block diagram of a preferred embodiment of an apparatus implementing the method of the present invention.

Referring to FIG. 2, a more detailed block diagram of the cell phone base station 200 is shown. In a preferred embodiment the cell phone base station 200 is contained within a Telephone Adjunct Device [TAD], however it will be recognized that the cell phone base station 200 could just as easily be part of a CPE. The Hardware 400 located within the cell phone base station 200 contains, among other things, a microprocessor 410, data bus D 420, address bus A 430 and Input/Output [I/O] 440. As will be understood, these components form a digital device whose architecture is common in contemporary telephony equipments. As such Hardware 400 is not discussed in detail to aid in clarity, however, generally the microprocessor 410 operates based on program instructions contained in Memory 300. The set of instructions contain the necessary program code to direct I/O circuits 440 in such a way as to control the operation of the cell base station 200. In a preferred embodiment of the present invention, the microprocessor is a 6805 from Motorola, Inc., Schaumburg, Ill.

The DSI 250 shown in FIG. 1 is comprised of Line Switch 255, CPD/1 260 and Local Wireless Network Interface [LWNI] 265. Each of the components is discussed in greater detail below in conjunction with FIG. 3, but generally, Line Switch 255 accomplishes the physical connection and disconnection of devices to the PSTN 810 under control of Switch Logic 330 and Control Software 310. The CPD/I 260 provides the necessary hard-wired interface for both the Aux POTs Device 285 and the Cell Device 275, and LWNI 265 provides a local wireless interface to Cell Device 275. As detailed below, the Aux POTs 285 provides the user with the ability to use the cellular wireless network directly without the need to accomplish any line switching or remove Cell Device 275 from its cradle.

Note that although the Cell Device 275 appears to be connected to the CPI/D 260 by a single wire, in operation a cell phone is typically placed in a socket, or cradle, formed in the chassis of the cell phone base station and consists of a number of wires for control, power and signaling. In this way, a variety of cell phone devices can be accommodated simply by changing the cradle. In one embodiment of the present invention the cradle is designed to easily be removed and replaced. Thus the cell phone base station 200 in a preferred embodiment of the present invention can work with a plurality of cell phones. For example, the cell base station 200 of the preferred embodiment of the present invention may be configured to accommodate Motorola V60 or StarTac phones from Motorola, Inc., Schaumburg, Ill., Ericcson T612 or R3002 phones from LM Ericcson Telephone, Inc., Stockholm, Sweden, or Nokia Series 51, Series 61, or 3285 and 7160 phones from Nokia, Helsinki, Finland. It will be clear to those of skill in the art that other cell phone models from other manufacturers could be used without departing from the spirit of the invention, thus absence of these other phone models should not be read as a limitation on the scope of the invention.

As mentioned above, Memory 300 contains the necessary program code to operate the cell base station 200 generally. Moreover, Memory 300 contains the program code responsible for implementing the method of the present invention specifically. The program code is comprised of Wireless Network Protocol Stack 305, Control Software 310, Call Manager 320, Switch Logic 330, and DIAS 340. Control Software 310 provides the overall process control for the method of the present invention including power management, housekeeping, diagnostics, and other general and administrative tasks required by a contemporary digital device. Note that functions other than those listed may be present in Control Software 310, but are not discussed since they do not directly impinge on the method of the present invention. This should not be read as a limitation on the scope of the invention.

Wireless Network Protocol Stack 305 provides the necessary program code to operate a local wireless network. As will be discussed below in conjunction with FIG. 3, a local wireless network can advantageously be used to eliminate the need for a hard-wired interface to a cell phone device. Call Manager 320 contains the necessary program code to operate the high level tasks of the method of the present invention. These include monitoring all devices attached to the PSTN wiring 810, determining which, if any, of the devices is active, and directing traffic to the appropriate device in response to specific communications session conditions. For example, as will be discussed in detail below, should the user wish to dial an emergency call, the Call Manager 320 forces the call to be routed to a POTs device rather than a cell phone.

Switch Logic 330 contains the necessary program code needed to monitor the communications system and make the economic decision about which of a plurality of communications devices is best for a particular communications session. This is accomplished by monitoring a number of variables, some programmed by the user and some based on real-time conditions of the communications network. Examples of user programmed variables include, but are not limited to, enabling long distance over a cell phone and enabling a time-of-day check. Examples of real-time communications network conditions include, but are not limited to, cellular signal strength and available free airtime minutes from a cellular provider. Each of these variables, as well as others, is discussed in detail below in conjunction with FIG. 5.

DIAS 340 is an integrated answering service resident in Memory 300. The function of the DIAS 340 is to record voice messages in the event that the user does not answer an incoming call. This is accomplished in a manner well understood in the art. DIAS 340, in a preferred embodiment, is a ISD5216 from Winbond Electronics Corporation in Hsinchu Science Industrial Park, Taiwan. Since the operation of DIAS 340 does not impinge directly on the method of the present invention it is not discussed in detail, however, absence of a detailed discussion should not be read as a limitation on the scope of the invention.

Still referring to FIG. 2, I/O 440 connects to DSI 250 and CPD/I 260. CPD/I 260 in turn interfaces with user telephony devices as discussed above. Also present in FIG. 2 are RJ-11 Connector 122A, Transposer 130A and CPE Device 120A. Each of these refers to the similarly labeled items in FIG. 1. RJ-11 Connector 122A allows each of the two circuits present on the PSTN 810 to be attached to a user device. This type of connector is well known in the art and need not be addressed in detail. Transposer 130A is used to switch the primary and secondary input circuits of any POTs device attached to it and is discussed in detail below in conjunction with FIG. 4. CPE Device 122A is a contemporary POTs telephone device of the type well known in the art. Operation of this type of device does not directly impinge on the method of the present invention thus is not discussed in detail.

Figure 3:
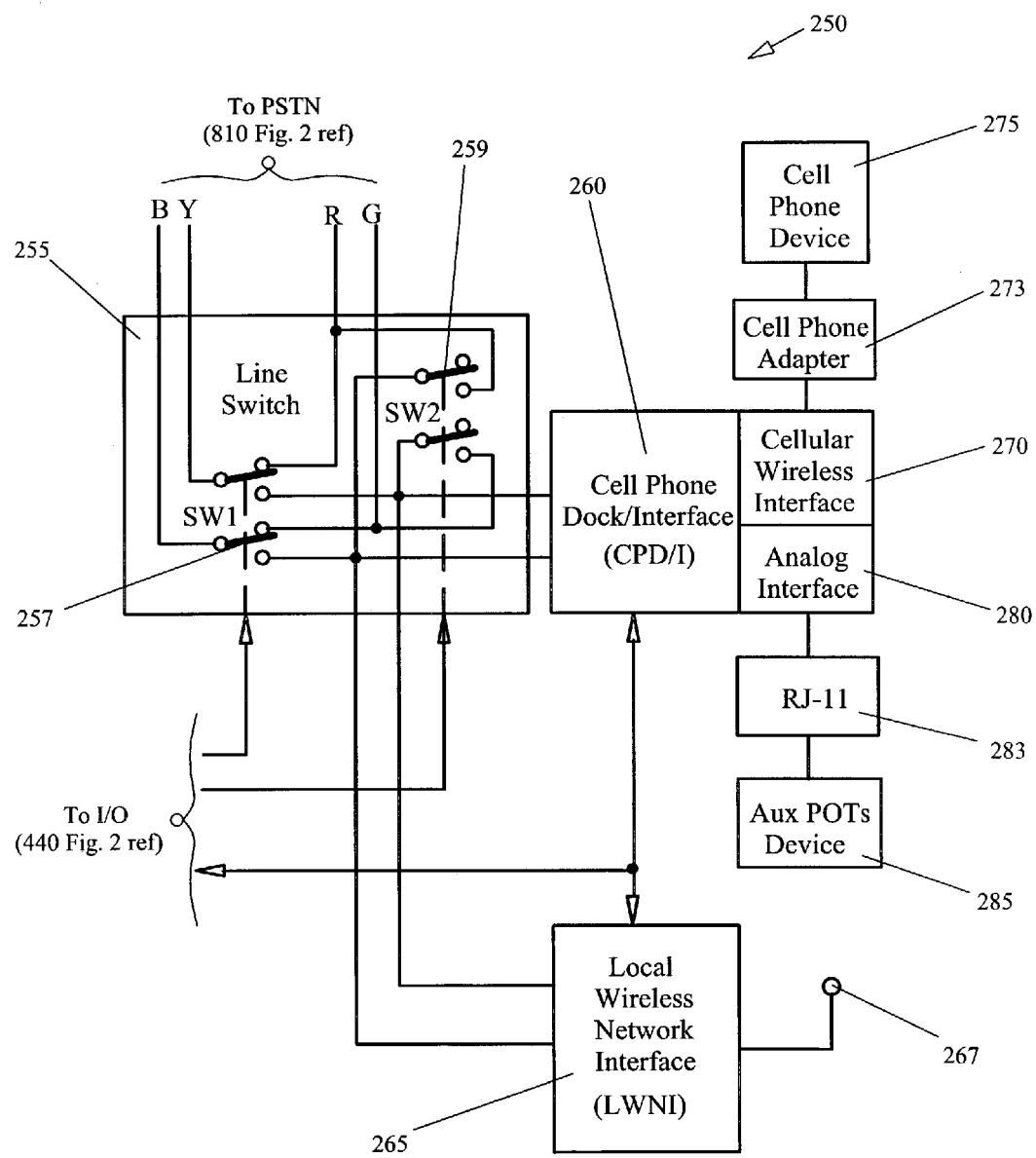
FIG. 3: is a detailed block diagram of the Dual System Interface apparatus of a preferred embodiment of the present invention.

Looking now at FIG. 3, further details of DSI 250 are shown. Notice that Line Switch 255 is comprised of two double-pole, double-throw switches SW1 257 and SW2 259. As described briefly above, the general function of the Line Switch 255 is to direct traffic for a particular communications session to the appropriate device. As will be discussed just below, two switches are required to accommodate the various device/line possibilities.

The default case for Line Switch 255 is to have the PSTN 810 connected to the POTs devices. This means that switches SW1 257 and SW2 259 are in the positions shown in FIG. 3. In this configuration, the primary circuit from PSTN 810 (the R-G pair) appears on the secondary circuit (the B-Y pair) and, via a transposer such as Transposer 130A of FIG. 1, on the primary circuit of a POTs device attached to the residential wiring. This necessarily means that a cell phone such as Cell Phone Device 275 is not connected to the residential wiring even though the device is seated in Cell Phone Adapter 273. As can be seen, the CPD/I 260 is connected to Cell Phone Adapter 273 via Cellular Wireless Interface 270, however, the output of the CDP/I 260 terminates at open terminals of switches SW1 257 and SW2 259. But at the same time, Aux POTs Device 285 is connected in parallel with Cell Phone Device 275 via Analog Interface 280 such that in the default condition, a user may initiate and/or receive cell calls using the Aux POTs device 285.

Also terminating at the open terminals of switches SW1 257 and SW2 259 is the LWNI 265. LWNI 265 operates under the control of the Wireless Network Protocol Stack 305 located in Memory 300. Attached to LWNI 265 is an antenna 267. In one embodiment of the present invention, the LWNI 265 provides a medium for communications sessions via antenna 267 to Cell Phone Device 275. When operated in this configuration, no hard-wired cell phone connection need be made. Instead, all transactions occur over the local wireless network medium. In an exemplary embodiment, the LWNI 265 is based upon a MC72000 Integrated Bluetooth Radio chip from Motorola, Inc., Schaumberg, Ill. Bluetooth is a low power wireless communication technology. As will be recognized, other local wireless network standards could be used without departing from the spirit of the invention, thus the Bluetooth local wireless network is used only by way of example.

In a second embodiment of the present invention, the wireless interface is accomplished by an infrared [IR] beam of light. As with the low power radio method just above, the IR interface is controlled by Wireless Network Protocol Stack 305 located in Memory 300. In the second embodiment of the present invention the IR interface is based on a MCP2140 from Microchip Technology Inc. located in Chandler, Ariz. As will be recognized, other IR interfaces could be used without departing from the spirit of the invention.

As will be detailed below in conjunction with FIG. 5, should Switch Logic 330 determine that the cell phone is the more economic device for a given set of communications network conditions, switch SW1 257 toggles and attaches the CPD/I 260 output to the secondary circuit, enabling the communications session to be transacted over the cellular wireless network from any POTs device attached to the residential wiring. Other combinations of communications session requirements and user actions cause different switch closures to occur. These are covered in detail in the discussion of FIG. 5 below. Note also that other connections to I/O 440 exist, for example, indicator lights and/or key buttons, but since these operate in the customary manner and do not directly impinge on the method of the present invention they are not discussed in detail to aid in clarity. Absence of a detailed discussion of these other connections should not be read as a limitation on the scope of the invention.

Figure 4A:
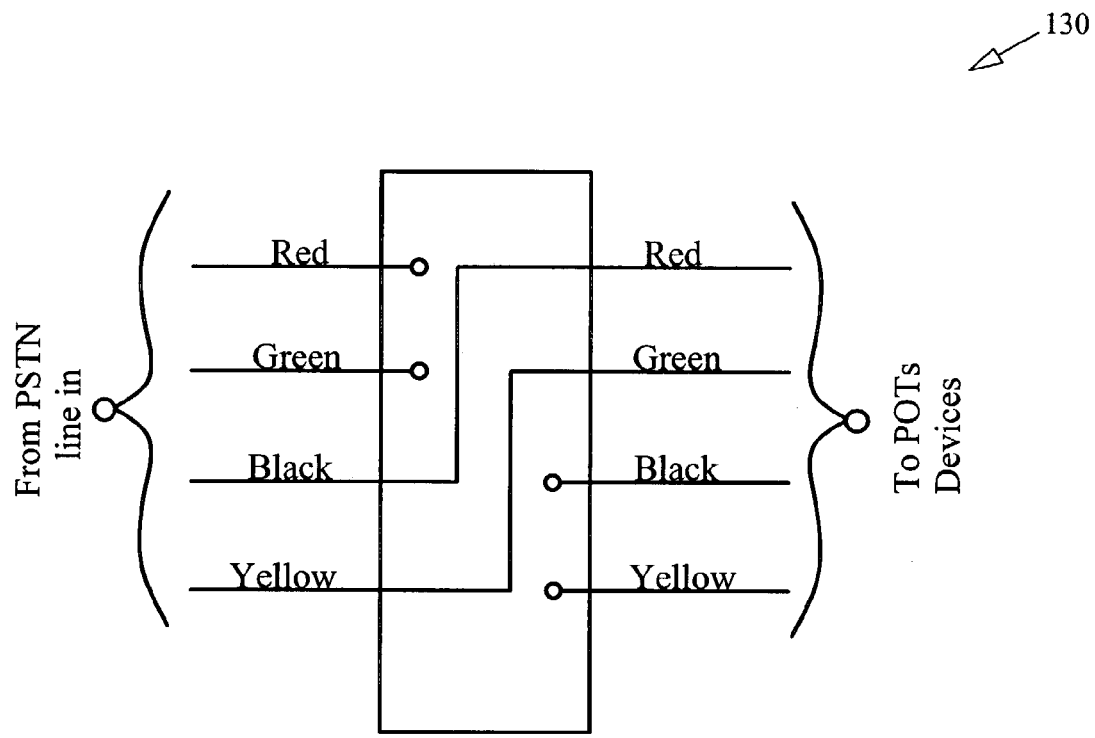
FIG. 4: presents a preferred embodiment of a line transposing device required to implement the method of the present invention.

Turning to FIG. 4, a typical Transposer 130 is shown in detail in both schematic and isometric form. Note that this could be any of the transposers shown in FIG. 1. In a contemporary CPE device such as a POTs telephone equipment, all four wires from the PSTN 810 (see FIG. 2) are present at the input connector. These four wires form two distinct circuits, as discussed at length above. The method of the present invention must use both of these circuits in order to facilitate selection of the most economic device, thus the Transposer 130 is required. As shown in the schematic view in FIG. 4A, the primary circuit of PSTN 810, or the red and green pair, is terminated at the input to Transposer 130. Further, the secondary circuit from the POTs device, or the black and yellow pair, is terminated at the output of Transposer 130. However, the secondary circuit, or the black and yellow pair arriving from PSTN 810 is cross connected, or transposed, to the primary circuit, or red and green pair, of the POTs device. In this way, communications traffic appearing on the primary circuit of the POTs device connected to Transposer 130 appear on the secondary circuit of PSTN 810.

Recall that Line Switch 255 in FIG. 2 is connected to the secondary circuit of PSTN 810. Further recall that Line Switch 255 is configured in such a way as to toggle between the primary circuit of PSTN 810 and the parallel combination of CPD/I 260 and LWNI 265. Thus when a user of the method of the present invention initiates an outgoing communication session using a POTs device in the premises, and if the method of the present invention has determined that the cell phone is the most economical communications medium, traffic from the POTs device appearing on the secondary circuit of the premises wiring is directed to the Cell Phone Device 275 via either the CPD/I 260 or the LWNI 265 if the user has entered a predetermined signal. As will be discussed below, one unique feature of the method of the present invention is the ability of the user of a POTs device to enter a control signal which initiates the economical decision analysis and, if appropriate, connection to a cell phone.

If the user chooses not to enter the control signal, the communications session will transit the PSTN. This occurs since the default condition for Line Switch 255 is to connect the primary circuit of PSTN 810 to the secondary circuit of the premises wiring as explained above. In this case, traffic from the POTs device appearing on the secondary circuit of the premises wiring is directed to the primary circuit of PSTN 810 and thence to the CO (900 in FIG. 1.)

Suppose now that an incoming call is received on the user's cell phone. The method of the present invention outputs a distinctive ring signal on all POTs devices in the premises aurally indicating to the user that a cell call is being received. The user may pick up any POTs device which automatically causes the Line Switch 255 to toggle, connecting the incoming cell phone to the POTs device in the same manner as for an outgoing call. Alternatively, if the method of the present invention has been configured with a LWNI, the same process occurs however the medium for transfer of the communications session will be via the local wireless interface. Another unique feature of the present invention is the ability of a user to receive incoming cell phone calls on a POTs device without the need to physically switch between telephony devices. Of course, if the user takes the cell phone off hook, the call will transit the cellular network in the customary manner.

Figure 4B:
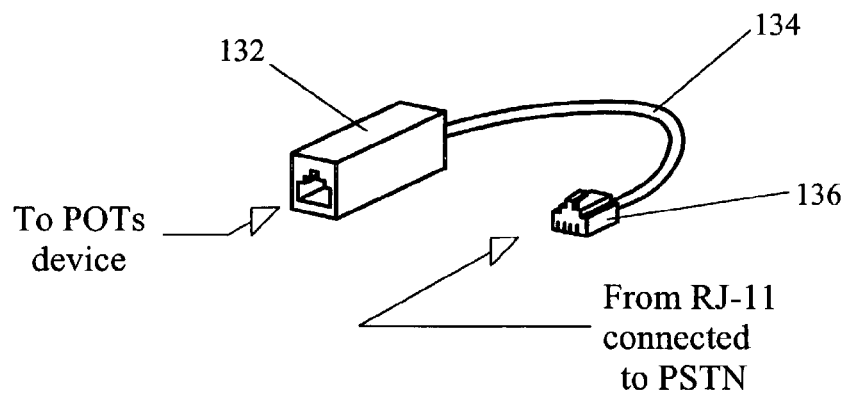

FIG. 4B provides an isometric view of Transposer 130 in a preferred embodiment of the present invention. An encapsulated block 132 contains the wiring shown in FIG. 4A above. A short pigtail 134 is attached between the encapsulated block 132 and a male RJ-11 connector 136. In this way a POTs device may be attached to female RJ-11 connector 132 and the PSTN (810 in FIG. 1) may be connected to the male RJ-11 connector in encapsulated block 136. In a preferred embodiment both encapsulated block 132 and male RJ-11 connector 136 are formed of plastic, however, the trasnposer could be made from a variety of materials without departing from the spirit of the invention, thus the scope of the invention is limited only by the claims. Also in the preferred embodiment of the present invention, the pigtail length is approximately three inches, but as will be recognized, this length could be greater or lesser without affecting the operation of the present invention. Also as will be recognized, the transposer need not be configured as shown in FIG. 4B. For example, the tranposer could be formed from a single block with RJ-11 connectors on both ends without departing from the spirit of the invention, thus use of the pig tail transposer should not be read as a limitation on the scope of the invention.

Turning now to FIG. 5, a flowchart of the method of the present invention is presented. FIG. 5A provides an overall view of the process, FIG. 5B provides of the Initialization process, FIGS. 5C and 5D provide the details of the Call Manager software module (320 in FIG. 2), FIG. 5E details the Switch Logic software module (330 of FIG. 2), and FIG. 5F provides the detail for the economic decision. Each of these figures will be discussed in detail in turn. Note that although the method of the present invention provides both a local wireless communications medium and a hard-wired communications medium for use by Cell Phone Device 275, the detailed discussion that follows is based upon the hard-wired interface CPD/I 260. However, the discussion of the method of the present invention could just as well pass local cell phone communications via the local wireless network interface LWNI 265. Since the operation of the LWNI 265 does not directly impinge on the method of the present invention, it is not discussed in detail. This should not be read as a limitation on the scope of the invention.

Figure 5A:
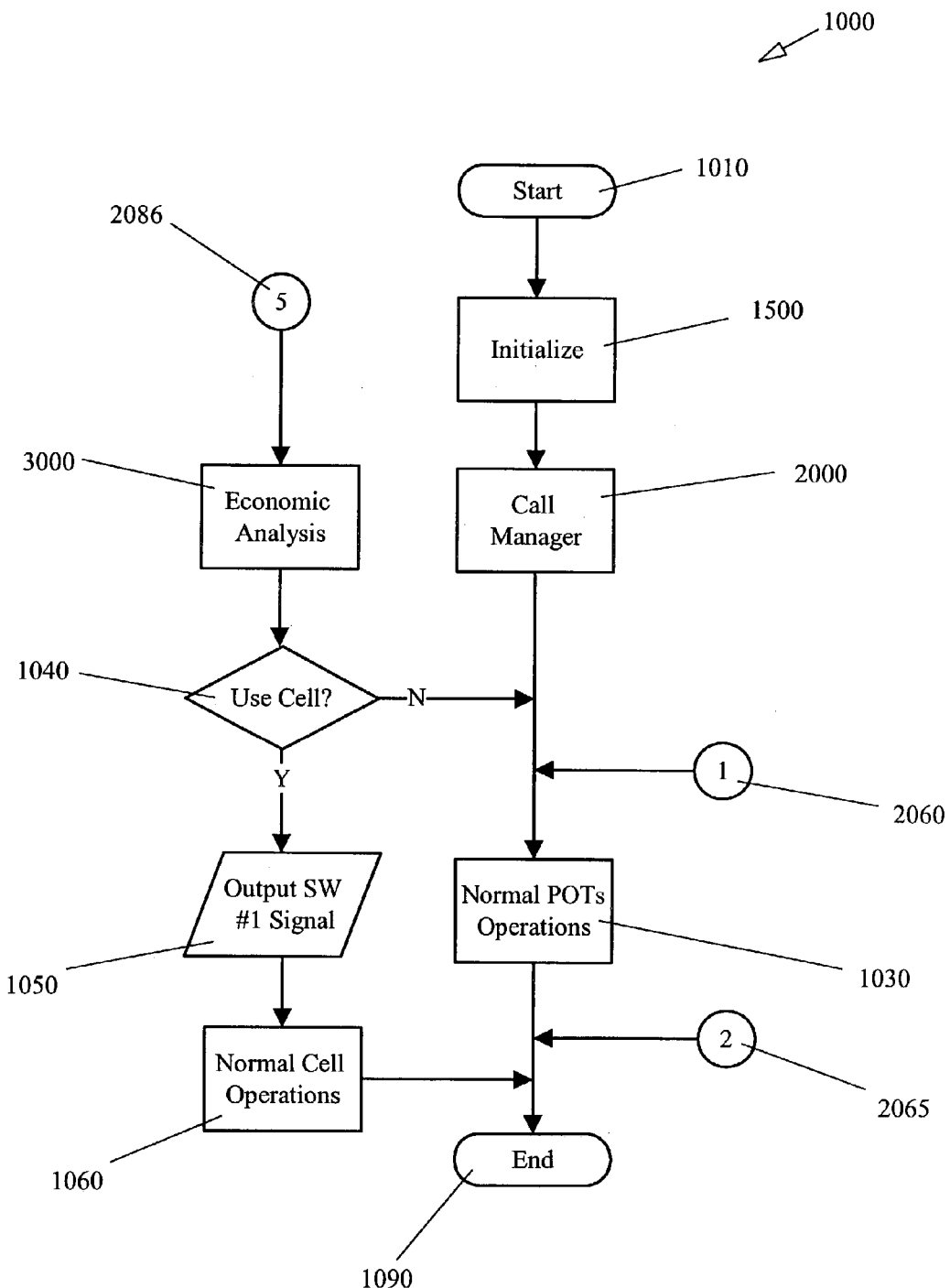
FIG. 5: is a flow chart describing the operation of the method of the present invention.

FIG. 5A shows the overall process flow 1000 for the method of the present invention. The process begins at the Start step 1010, where power is applied to the apparatus of the present invention discussed in conjunction with FIG. 2 above. At process step 1500 the initialization tasks required for a digital device are executed by Control Software 310 contained in Memory 300 in concert with Microprocessor 410, each in FIG. 2. These steps include, but are not limited to power up, diagnostic execution, initialization of program variables, loading of user data, and setting initial values of registers and pointers. These functions are not discussed in detail since they do not directly impinge on the method of the present invention and are well understood by those familiar with the operation of contemporary digital devices, however, this should not be read as a limitation on the scope of the invention. However, the system configuration tasks related to the method of the presnt invention are discussed in conjunction with FIG. 5B below. Upon completion of Initialization process step 1500, the apparatus is ready to perform the method of the present invention. Note that for all discussion that follows, it is assumed that the apparatus of the present invention is operating properly and that the user is familiar with the steps needed to cause the invention to execute correctly.

After completing the Initialization process step 1500, the process enters the Call Manager routine 2000. As will be discussed in detail below in conjunction with FIGS. 5C and 5D, Call Manager 2000 makes a number of high level decisions regarding the type of communications session currently active, if any. This is necessary since the method of the present invention will be unable to select the most economic device for a particular communications session if other communications sessions already exist on any of the devices in the premises. Other managerial tasks are also implemented in the Call Manager 2000 such as message recording and ringing control.

Upon returning from Call Manager 2000 the process enters the Normal POTs Operations 1030. As detailed below, this occurs since the only path out of the Call Manager 2000 results in the communications session being transacted over the PSTN. Normal POTs Operations 1030 are not discussed in detail since these operations are well known in the art and do not directly relate to the method of the present invention. Upon exiting from Normal POTs Operations 1030 the process halts at End step 1090.

As well as the return path from Call Manager 2000, there are several other paths into Normal POTs Operation 1030. The first of these is from the Use Cell decision 1040, discussed just below. Other entries occur via Off Page connector 1 2060 and Off Page connector 2065 These paths are part of the detailed discussion of Call Manager 2000 in conjunction with FIG. 5C. As with Off Page connector 1 2060, Off Page connector 2 2065 provides a path to End step 1090 from Call Manager 2000 and will be discussed below.

As will be described below in detail, one function of the Call Manager 2000 is to determine if the user has entered a code allowing the remote selection of the cell phone network for use by a POTs phone located somewhere in the premises. If this has occurred, the flow enters FIG. 5A at Off Page connector 5 2086. Although the user has entered the code, before switching to the cellular wireless network an economic decision is made by Economic Analysis 3000, discussed below in conjunction with FIG. 5E. If the analysis indicates that the cellular wireless network is not the better economic choice, the No branch out of Use Cell decision 1040 is followed, causing the Normal POTs Operations 1030 process to be executed. The communications session will thus transit the PSTN as described above.

If the analysis from Economic Analysis 3000 indicates that the cellular wireless network is the better economic choice, the Yes branch out of Use Cell decision 1040 is followed. This causes the Output SW#1 Signal 1050 to be generated by the Control Software 310 of FIG. 1. When this occurs the secondary circuit of the residential wiring is transferred from the primary circuit, where it was connected to the PSTN, to the input to the CPD/I 260 where it is connected to the Cell Device 275. The communications session will now transit the cellular wireless network. The flow now enters the Normal Cell Operations 1060. Normal Cell Operations 1060 are not discussed in detail since these operations are well known in the art and do not directly relate to the method of the present invention. The flow exits the Normal Cell Operations 1060 when the session is complete and the process stops at End step 1090. In this way the method of the present invention allows a user to remotely select which of a plurality of telephony devices connected to standard residential wiring to use for the most economical communications session.

Figure 5B:
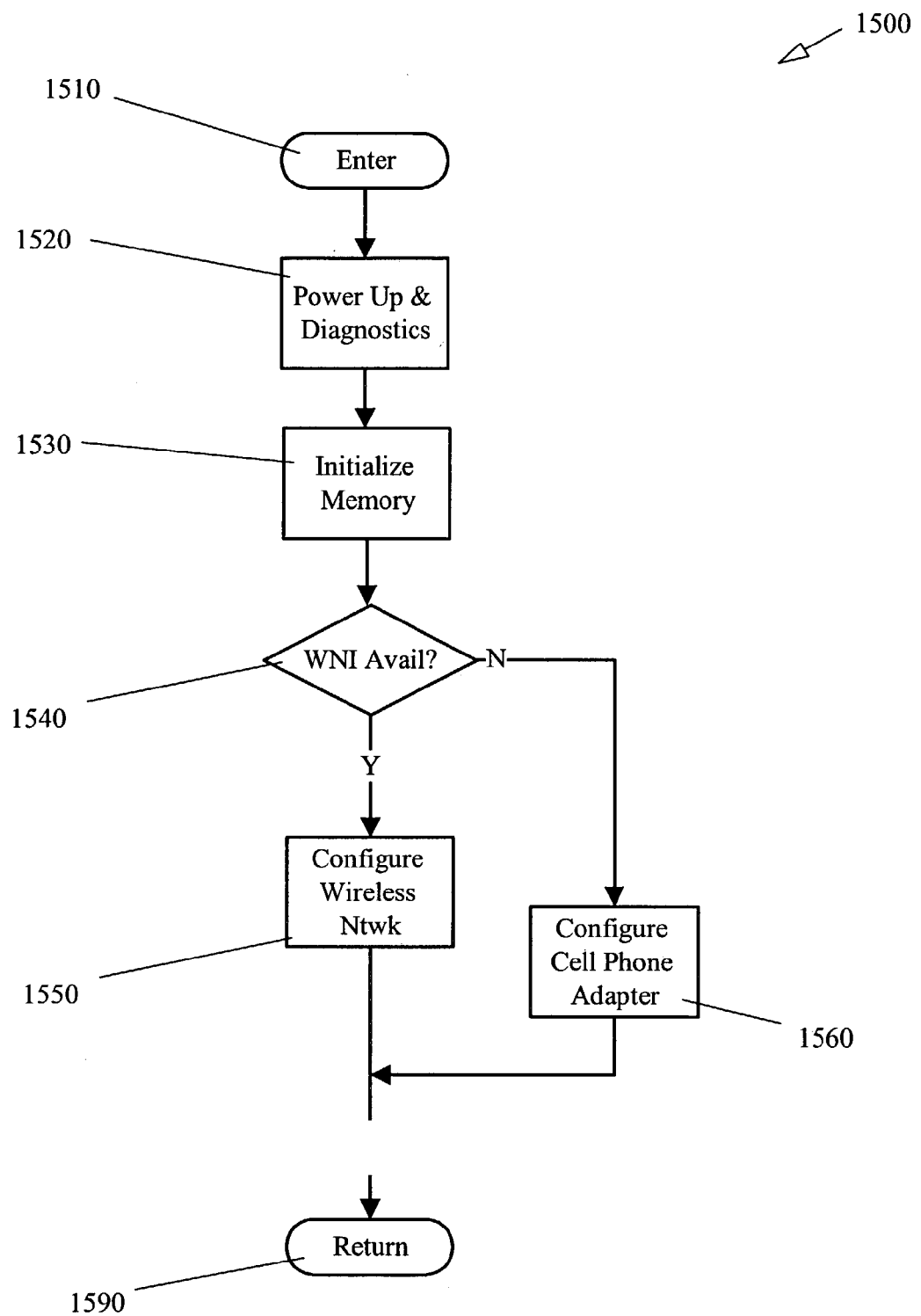

FIG. 5B provides the details of the Initialize process step 1500. The process is entered via Enter step 1510. At Power Up & Diagnostics step 1520 the method of the present invention accomplishes those tasks generally required by a contemporary digital device. As mentioned above, these tasks do impinge directly on the method of the present invention thus are not discussed in detail to aid in clarity. At Initialize Memory step 1520 initialization of program variables, loading of user data, and setting initial values of registers and pointers is accomplished. As with Power Up & Diagnostics step 1520 these tasks do impinge directly on the method of the present invention thus are not discussed in detail to aid in clarity.

The method of the present invention provides a plurality of communications mediums over which to transact communications sessions. Two of these are a hard-wired cell phone device interface and a local wireless network interface. At WNI Available decision 1540, the system is queried to determine if a local wireless network interface, such as LWNI 265, is available. If it is the Yes path is followed out of WNI Available step 1540 to Configure Wireless Network step 1550. The system memory is programmed with the required data to pass cell phone device communications over the local wireless network.

If a local wireless network interface is not available, the No branch is followed out of WNI Available decision 1540 to Configure Cell Phone Adapter step 1560. As with Configure Wireless Network step 1550 just above, The system memory is programmed with the required data to pass cell phone device communications over the hard-wired cell phone interface. At Return step 1590 the process enters the Call Manager process 2000.

Figure 5C:
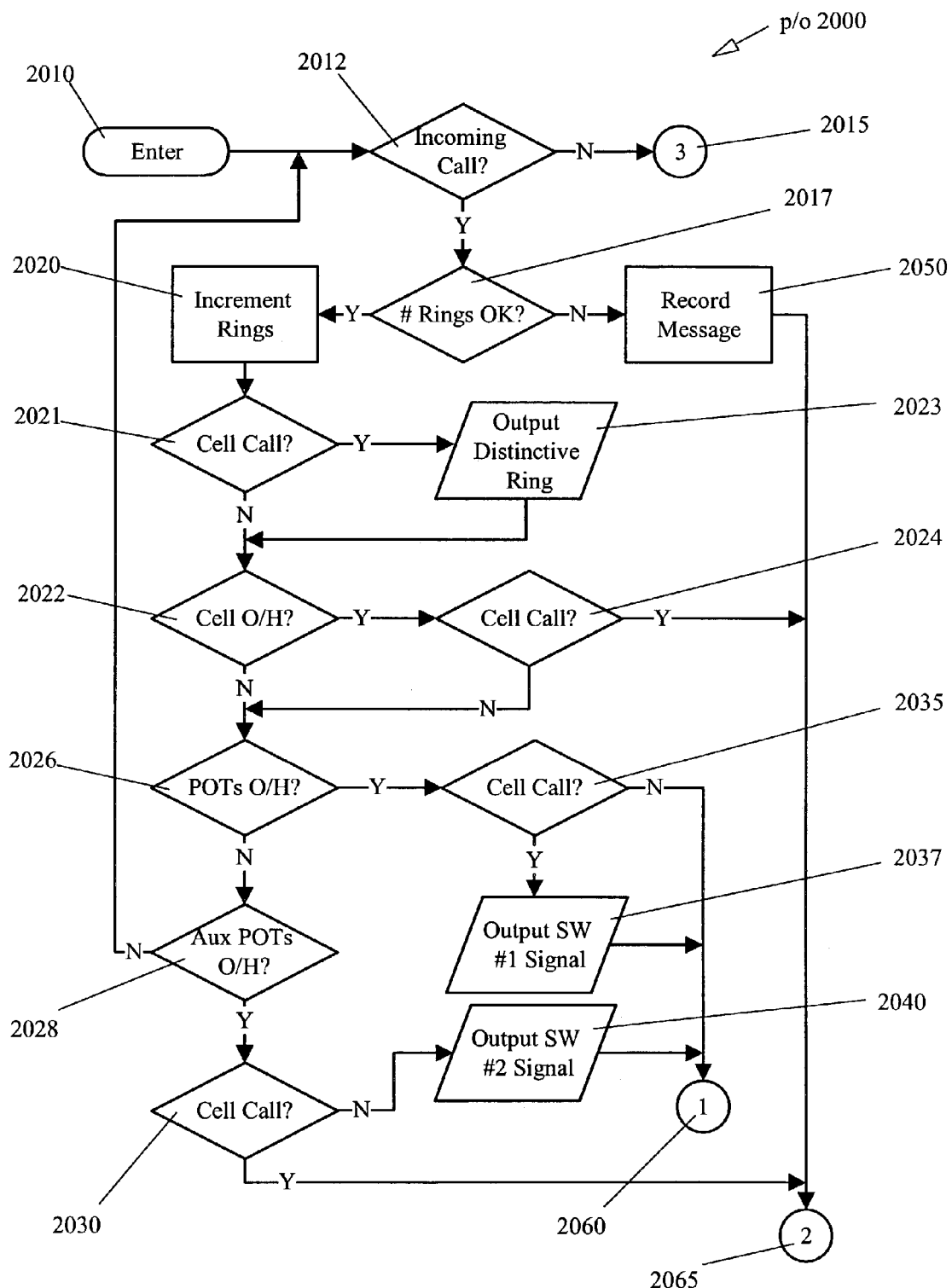
Figure 5D:
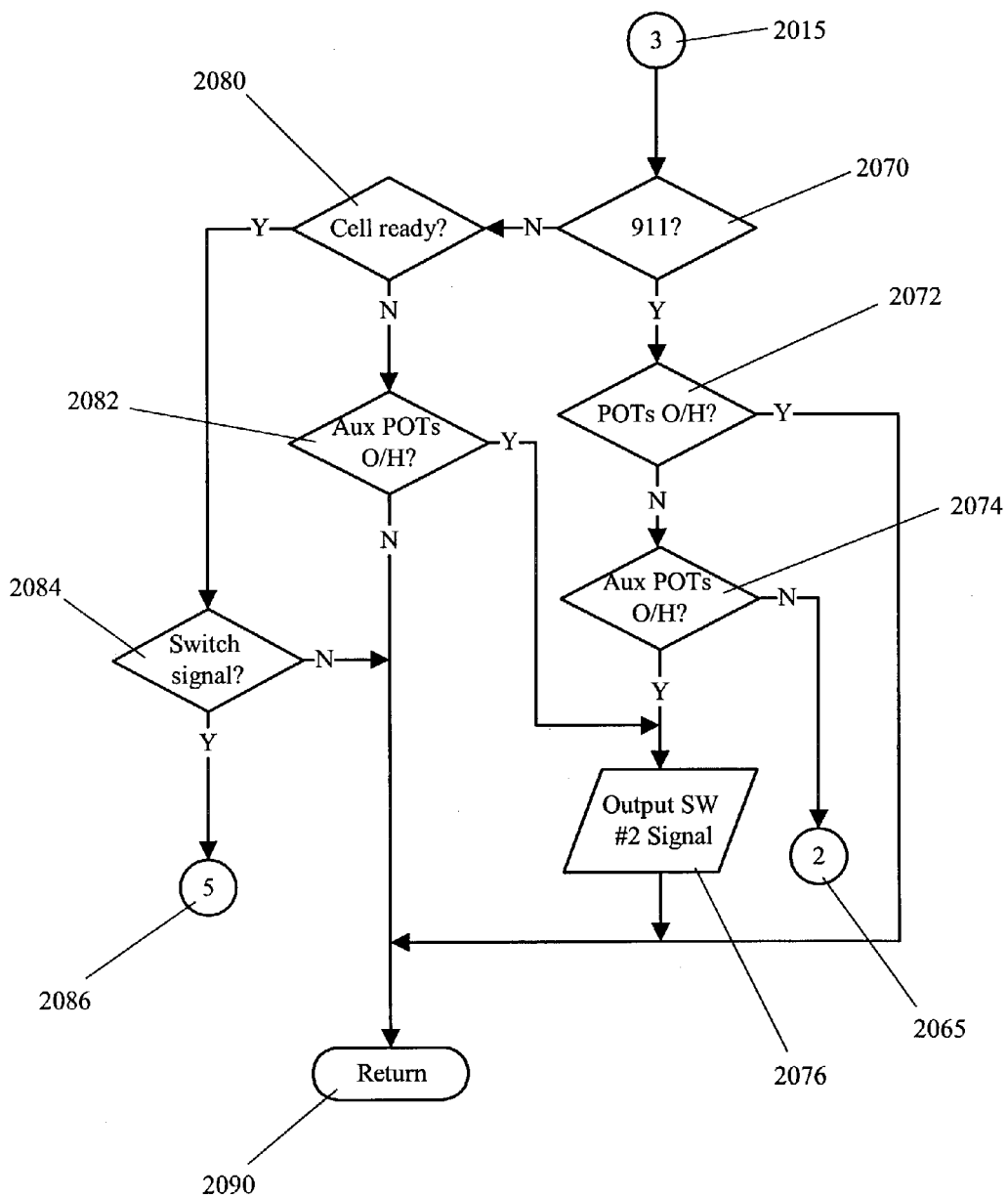

Turning now to FIGS. 5C and 5D, the process flow for the Call Manager 2000 is shown in detail. Beginning with FIG. 5C, the process is entered at Enter step 2010. At Incoming Call decision 2012 the method of the present invention determines if an incoming call is present. If it is not, flow follows the No path to FIG. 5D via Off Page connector 3 2015, discussed just below. If an incoming call is present the Yes path is followed out of Incoming Call decision 2012 to the # Rings OK decision 2017. As with most contemporary telephony equipments, the DIAS 340 can be preset to a number of ring signals. Exceeding this number will cause the DIAS 340 to intercept the call and engage the answering function.

If the preset number of rings has been exceeded the No path is followed out of # Rings OK 2017, entering the Record Message process step 2050. The Record Message process step 2050 is well known in the art and is not discussed in detail to aid in clarity, however, absence of a detailed discussion should not be read as a limitation on the scope of the invention. After the incoming message has been recorded the process flow transfers to the End step 1090 of FIG. 5A via Off Page connector 2 2065. Note that the DIAS 340 responds to both PSTN and cellular wireless network calls, advantageously providing the user with a single answering device for all communications mediums in the premises.

If the preset number of rings has not been exceeded, the Yes path is followed out of # Rings OK decision 2017. The number of rings counter is incremented in Increment Rings step 2020 and at Cell Call decision 2021 the method of the present invention determines if the incoming call is a cellular wireless call. This is necessary in order to output a distinctive ring to indicate to the user who may be in a remote location that the incoming call is a cell call. If the incoming call is a cell call the Yes path is followed out of Cell Call decision 2021 to the Output Distinctive Ring process step 2023. In a preferred embodiment of the present invention the distinctive ring is comprised of one long signal burst followed by three short signal bursts. The long burst in the preferred embodiment is 800 milli-seconds in length while each of the short bursts are 250 milli-seconds in length. The ring bursts are emitted at the normal ring frequency of a particular telephony device, thus a POTs phone will provide the distinctive ring at its normal ring frequency and a cellular telephone device will provide the distinctive ring at its normal ring. Once the ring has been sent the process transfers to the Cell O/H decision 2022.

If the incoming call is not a cellular call the No path is followed out of Cell Call decision 2021 to the Cell O/H decision 2022. This is necessary to determine if the user has answered the incoming call on the cell phone. If the cell phone has been taken off hook the Yes path is followed out of Cell O/H decision 2022 and enters the Cell Call decision 2024. If the incoming call is a cell call, the Yes path is followed and the process transfers to the End step 1090 via Off Page connector 2065 and the process stops since the communications session is transiting the cellular wireless network in the normal fashion.

If the incoming call is not a cell call the No path is followed out of Cell Call decision 2024 to the POTs O/H decision 2026. As will be discussed, this is necessary since the user has answered the incoming call on the cell phone but the call is transiting the PSTN, thus the Line Switch 255 must be properly configured to direct the incoming PSTN call to the Cell Device 275.

If the method of the present invention determines that a POTs device is off hook, the Yes path is followed out of POTs O/H decision 2026. In Cell Call decision 2035, if the incoming call is not a cell call it must be a PSTN call, thus the No path is followed returning the flow to Normal POTs operations 1030 via Off Page connector 1 2060. If the incoming call is a cell call, the Yes path is followed out of Cell Call decision 2035 to Output SW#1 Signal 2037. This is necessary in order to configure Line Switch 255 to connect the output of the cell phone to the residential wiring. Once the switch has been configured, flow passes to the Normal POTs Operations process 1030.

Supposing that neither the cell phone nor a POTs phone is off hook, process flow follows the No path out of POTs O/H decision 2026 to the Aux POTs O/H decision 2028. This is required since, while no POTs device or cell device is off hook, the auxiliary POTs device connected to the CPD/I 260 might be in use to answer the incoming call. If the auxiliary POTs device is not off hook the No path is followed out of Aux POTs O/H decision 2028, returning to the Incoming Call decision 2012. This loop occurs since the preset number of rings has not yet been exceeded, thus the method of the present invention is waiting for the next ring signal to occur.

If the auxiliary POTs device is off hook the flow enters the Cell Call decision 2030. This is required since, if the incoming call is a PSTN call, the Line Switch 255 must be configured to connect the residential wiring to the auxiliary POTs device. If the incoming call is a PSTN call, the No path is followed out of Cell Call decision 2030 to the Output SW#2 Signal step 2040. The process flow then returns to the Normal POTs Operations step 1030 via Off Page connector 2060 as described above. If the incoming call is a cell call, the Yes path is followed out of Cell Call decision 2030 and the flow passes to the End step 1090 via Off Page connector 2065 and the process stops. This occurs since the default connection for the auxiliary POTs device is to the cell phone device.

Referring to FIG. 5D, and recalling that following Off Page connector 3 2015 in FIG. 5C was the result of the No branch of Incoming Call decision 2012, the method of the present invention enters the 911 decision 2070. This occurs because in the absence of an incoming call the user must be initiating an outgoing call. The first decision that the method of the present invention makes is whether the outgoing call is an emergency.

If the outgoing call is an emergency the Yes branch of 911 decision 2070 is followed, leading to the POTs O/H decision 2072. Supposing for the moment that the user has taken a POTs device off hook somewhere in the premises, the Yes branch of POTs O/H decision 2072 is followed sending the process to the Normal POTs Operations process 1030 via Return step 2090. If the No path is followed out of POTs O/H decision 2072 the process enters the Aux POTs O/H decision 2074. If the auxiliary POTs device is not off hook, it must mean that the user has initiated an emergency call on the cell phone. Since the cell phone is off hook, the call will transit the cellular wireless network in the normal fashion, thus the process returns to the End step 1090 via Off Page connector 2065. Supposing now that the user has taken the auxiliary POTs device off hook to make the emergency call, the process enters the Output SW#2 Signal step 2076. This is required since, if the outgoing call is being made from the auxiliary POTs device, Line Switch 255 must be configured to connect the residential wiring to the auxiliary POTs device. Once the connection has been established the process enters the Normal POTs Operations process 1030 via the Return step 2090.

Returning to the 911 decision 2070, if the outgoing call is not an emergency, the No path is followed to the Cell Ready decision 2080. If for some reason the cell phone is not ready, the No path is followed to the Aux POTs O/H decision 2082. If the auxiliary phone device is not off hook, the outgoing call must be originating on a POTs device somewhere in the premises, so the process enters the Normal POTs Operations 1030 via Return step 2090 as was described above. However, if the user has initiated the outgoing call on the auxiliary POTs device, the Yes path is followed out of Aux POTs O/H decision 2082 leading to the Output SW#2 step 2076 for the same reason discussed just above.

If the cell phone is ready at Cell Ready decision 2080, the Yes path is followed leading to Switch Signal decision 2084. Switch Signal decision 2084 reacts to the presence of a predetermined signal from the user to switch from the default POTs devices to the cell phone device. This signal is sent to the apparatus of the present invention through standard Dual Tone Multi Frequency [DTMF] signaling, such as those signals generated by a touch tone keypad on a conventional POTs device. In a preferred embodiment, the signal entered is #. Although the minimum requirement of the present invention is one key, it will be understood that more or less key entries, or different keys than the one selected could be used without departing from the spirit of the present invention, thus the absence of these other possible combinations should not be read as a limitation on the scope of the invention. If the switch signal is detected the Yes path is followed out of Switch Signal decision 2084 to the Economic Analysis process 3000 via Off Page connector 5 2086. Thus it is the entry of a predetermined signal by the user that initiates the economic decision process that is enabled by the method of the present invention. The details of the economic analysis are discussed below in conjunction with FIG. 5F.

In the case where the user has intentionally elected not to use the cell phone for a particular communication session, then the absence of the predetermined signal, # in this case, will result in the No [N] path being followed out of Switch Signal decision 2084. This will lead to the Normal POTs Operations process 1030 via Return step 2090.

Figure 5E:
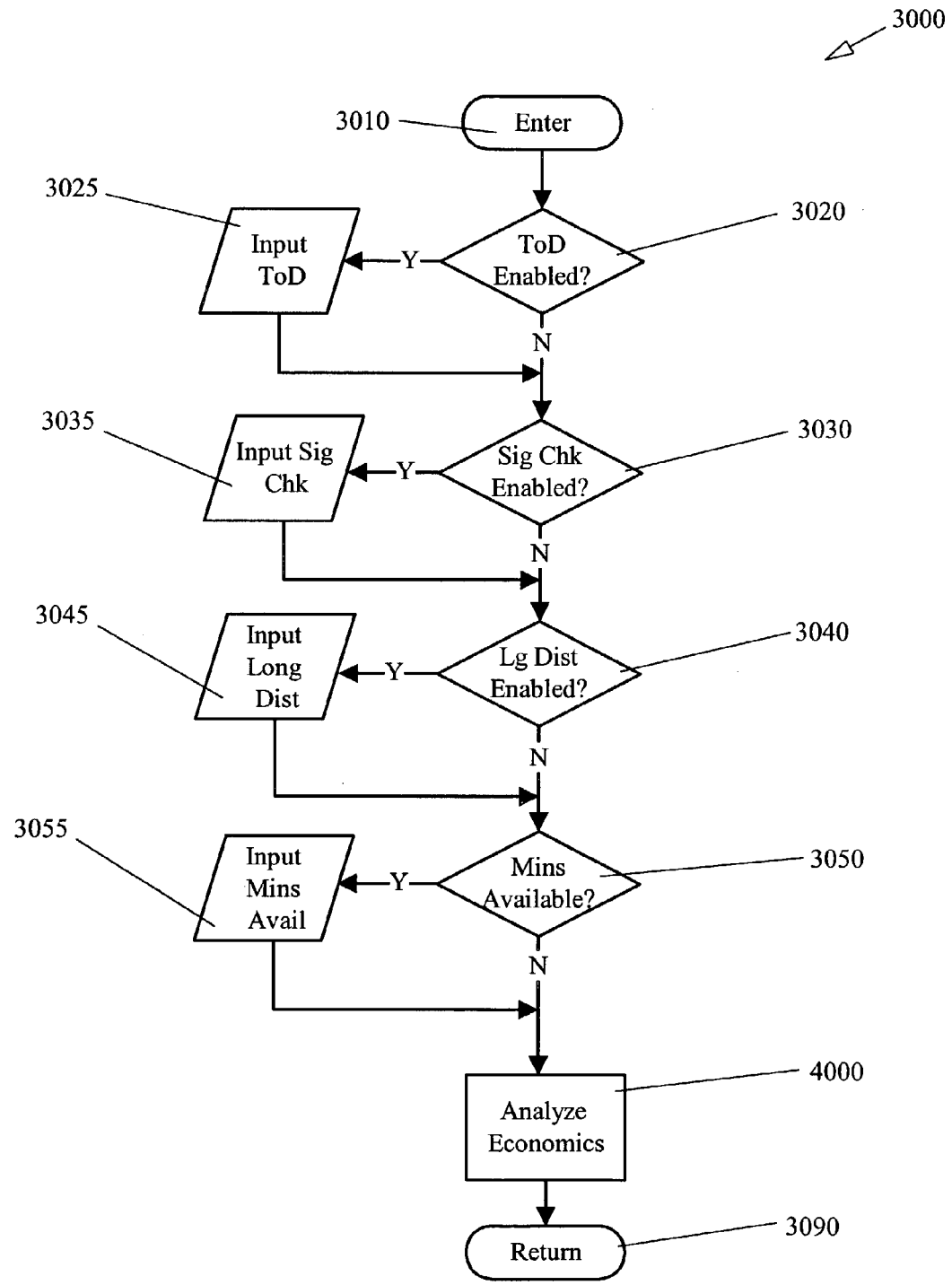
Figure 5F:
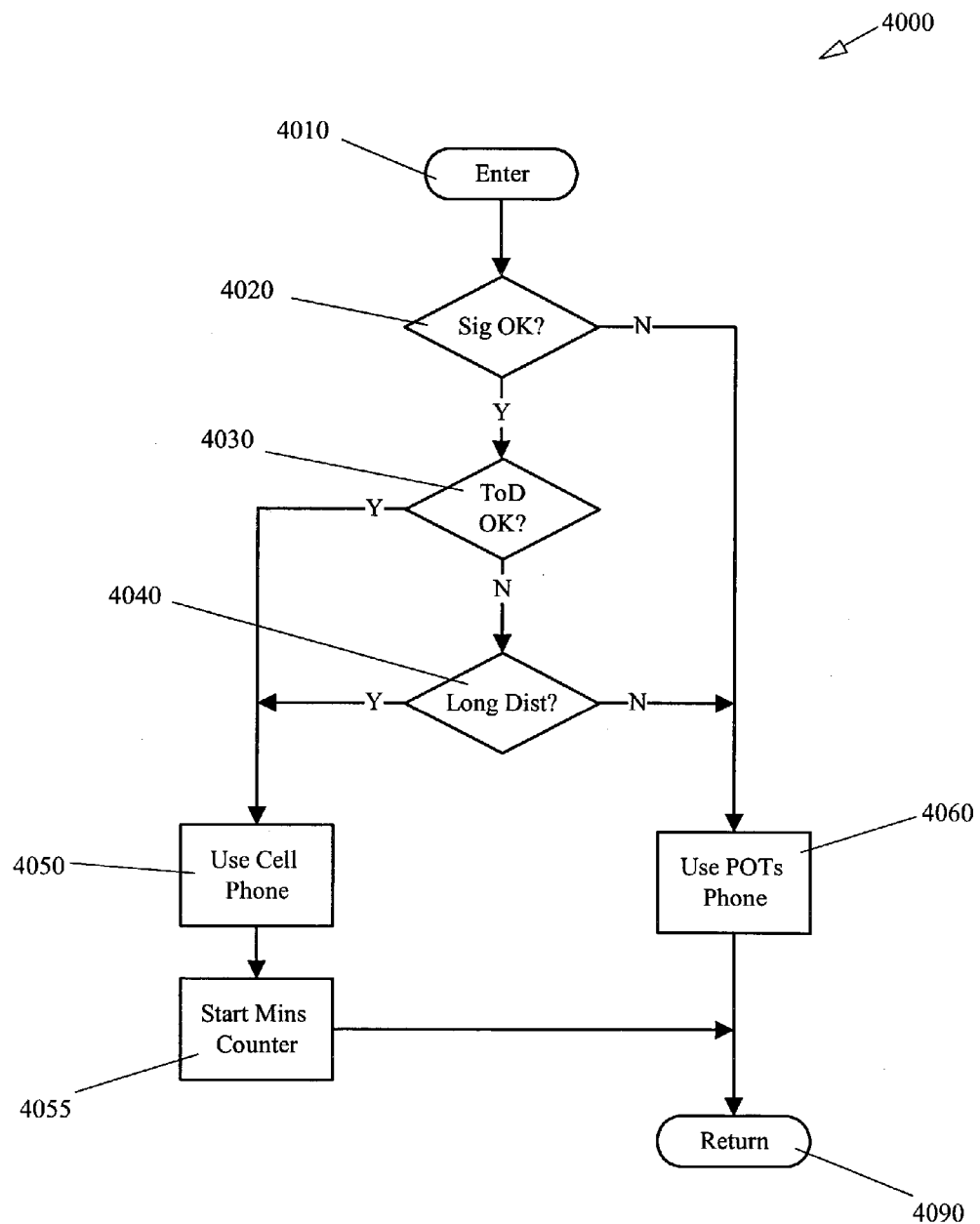

Referring back to FIG. 5A for the moment, recall that entering from Off Page connector 5 2086 is the result of taking the Yes path out of Switch Signal decision 2084 in FIG. 5D. This means that the user has entered the predetermined code prompting the method of the present invention to enable the economic analysis process 3000. FIGS. 5E and 5F present the detail of the economic analysis enabled by the method of the present invention.

In FIG. 5E the Economic Analysis process 3000 is shown. The process is entered via Enter step 3010. To make the best economic choice from among a plurality of telephony devices for the user, the method of the present invention requires certain data. Some of this data is entered by the user in response to system prompts or as part of the setup of the apparatus of the present invention, for example, enabling long distance calling and entering free minute data. Other items of data are garnered from system resources, for example the time of day and cellular wireless network signal strength. Once the data are present, they may be input to an analysis function and a decision regarding the optimum device to use for a particular communications session made by the method of the present invention.

At Time of Day [ToD] decision 3020 the method of the present invention determines if the user has enabled the Input ToD function. The reason that this function is required is because many cellular wireless carrier plans provide cheaper rates during so-called off-peak time periods. If the Tod function has been enabled, process flow follows the Yes [Y] path out of ToD Enabled decision 3020 to the Input ToD step 3025. Once the function has been selected the process flow passes to the Sig Chk Enabled decision 3030. If the ToD function has not been enabled, process flow follows the No [N] path out of ToD Enabled decision 3020 to Signal Check Enabled decision 3030. This function is required to accommodate the situation where the cellular wireless network signal lacks the necessary strength to reliably transact a communications session. As with the time of day function, if the signal strength function has been enabled, process flow follows the Yes [Y] path out of Signal Check Enabled decision 3030 to the Input Sig Chk decision 3035. Once the function has been selected the process flow passes to the Long Distance Enabled decision 3040. If the signal strength function has not been enabled, process flow passes to the Long Distance Enabled decision 3040 via the No [N] path out of Signal Strength decision 3030.

The Long Distance Enabled decision 3040 is needed in order to allow the user to take advantage of free long distance which may be offered by a their particular cellular wireless service provider. Thus if the user has a free long distance feature, the most economic choice by the method of the present invention will be to select the cell phone. If the long distance function has been enabled, the Yes [Y] path is followed out of Long Distance Enabled decision 3040, and process flow proceeds to the Input Long Distance decision 3045. Once the function has been selected the process flow passes to the Minutes Available decision 3050. If the long distance function has not been enabled, the No [N] path is followed out of Long Distance Enabled decision 3040 leading to the Minutes Available decision 3050.

The minutes available function allows the method of the present invention to automatically keep track of the free (or low cost) minutes available to the user over the cellular wireless network. Thus if the user has minutes available for use, the Yes [Y] path is followed out of the Minutes Available decision 3050, and process flow proceeds to the Input Minutes Available step 3055. Once the function has been selected the process flow passes to the Analyze Economics function 4000. If the minutes available function is not enabled, flow passes to the input of the Analyze Economics step 4000 via the No [N] path out of Minutes Available decision 3050.

Once all the various inputs have been input to the Input to Analyzer step 3060, the method of the present invention determines which of the various decision factors are enabled for the analysis process. The process flow proceeds to the Analyze Economics process 4000. Details of the Analyze Economics process 4000 are provided below in conjunction with FIG. 5F. Note that the functions discussed just above are not the only possible functions that could be enabled or disabled by a user of an apparatus such as that of the present invention and are presented as examples only. More or less functions could be present without departing from the spirit of the invention, thus the presence or absence of other functions should not be viewed as a limitation on the scope of the invention. After the Analyze Economics process 4000 has concluded, the flow returns to the Use Cell decision 1040 in FIG. 5A via Return step 3090.

Turning now to FIG. 5F, the details of the Analyze Economics step 4000 are shown. Recall that the input to the Analyze Economics step 4000 consists of one or more data arguments, some preprogrammed by the user and others taken from system resources. Which data appears at the input depends on the particular circumstances of a specific communications session, and may vary with time and activity. What is true in all cases is that the Analyze Economics step 4000 is entered at Enter step 4010 from either Input Minutes Available step 3055 or the Minutes Available decision 3050.

Once the data have been input, the process flow passes to the Signal OK decision 4020. A check is made of the strength of the signal from the cellular wireless network. If the signal fails to meet the minimum criteria, process flow follows the No [N] path out of Signal OK decision 4020 to the Use POTs Phones step 4060. As will be recognized, if the cellular wireless network signal lacks the appropriate signal characteristics there is no need to proceed with the economic analysis since the cell phone choice could lead to an unreliable communications session. From the Use POTs Phone step 4060 the process passes to the Return step 3090 in FIG. 5D via the Return step 4090.

If the signal from the cellular wireless network is acceptable, process flow follows the Yes [Y] path out of Signal OK decision 4020 and proceeds to the ToD OK decision 4030. Recall that the user may have a calling plan with a cellular wireless service provider that includes free (or cheaper) airtime minutes during certain time periods. If this is the case, and if the user has minutes available, the Yes [Y] path is followed out of ToD OK decision 4030 to the Use Cell Phone step 4050. At Start Minutes Counter 4055 the method of the present invention keeps track of the communications session time in order that the user minutes available be updated at the end of the session. From the Start Minutes Counter step 4055 the process returns to the Use Cell decision 1040 as described just above. For this instance the method of the present invention causes the Line Switch 255 to be configured such that the communications session is transacted over the cellular wireless network. In this way the method of the present invention ensures that the user transacts the communications session over the most economical medium.

If the ToD OK decision 4030 returns a result that indicates that no minutes are available, the process flow follows the No [N] path to Long Distance decision 4040. This is done since, while there may be no user minutes available, the user's cellular wireless service provider may provide free (or cheap) long distance rates when compared to the CO service over the PSTN. If the long distance communications session is cheaper over the cellular wireless network, the Yes [Y] path is followed out of Long Distance decision 4040, entering the Use Cell Phone step 4050. From here the process flow proceeds as described above. If, however, there is no economic advantage to using the cellular wireless network, the No [N] path is followed out of Long Distance decision 4040, returning by the flow described above.

While the method of the present invention just described provides three criteria upon which the economic decision is made, these are exemplary only. It will be understood that more or less criteria could be used without departing from the method of the invention, thus the scope of the invention is limited only by the claims. Although not described in detail, such other decision data could include more refined cost data for comparison, for example, airtime rates versus land line rates, calling card discounts, area code toll bypass, and long distance carrier selection data.

One advantage of the present invention is that it is economic. The user is able to minimize expenses for communications sessions automatically. The method of the present invention uses a plurality of data to determine which device among many is the most economical for transacting a particular communications session. The cost savings may be non-trivial depending on the circumstances. For example, long distance rates for CO service providers versus free long distance from a cellular wireless service provider.

A second advantage of the present invention is that it is bidirectional. Prior art instantiations are able to handle incoming communications sessions only. In contrast, the method of the present invention allows the user to both initiate and receive calls in the most economic manner providing a superior communications solution.

A third advantage of the present invention is remote selection. The user simply enters a predetermined signal via the DTMF keypad to initiate the economic decision process. This may be accomplished from any POTs device in the premises, eliminating the need to physically switch from one device to another as is the case with the prior art. Further, with the method of the present invention, should the user hear an incoming call to a cell phone, simply picking up any POTs device anywhere in the premises and entering the predetermined signal enables reception of the cell phone call, eliminating the necessity of the user to physically relocate to the cell phone.

A fourth advantage of the present invention is increased residential communications network flexibility. With the apparatus of the present invention the user effectively expands the residential communications network by adding an extension phone. Moreover, the added extension phone has the ability to be activated from any other POTs device in the premises, providing a superior solution when compared to the prior art methods.

A fifth advantage of the present invention is simultaneous operation of both cellular wireless and wire-lined telephony systems. Thus should a call received over the cellular wireless network and answered via the cell phone or the Aux POTs device, the POTs phones in the residence are still available for calls over the PSTN.

A sixth advantage of the present invention is the distinctive ring emitted on all premises POTs devices in response to receiving an incoming cellular telephone call. The user will recognize that the incoming call is on the cell phone and thus be able to make a decision about how to respond.

A seventh advantage of the present invention is the use of a local wireless network interface. Doing so allows the elimination of the hard-wired interface reducing the cost and complexity of the system. More advantageously, the user is able to use the charging station from the manufacturer, making the method of the present invention compatible with virtually all cellular telephone devices.

An eighth advantage of the present invention is the use of a single message recording system for both incoming cellular wireless and PSTN calls. Thus the need for the user to check the answering service provided by the cell provider as well as that provided by the PSTN service provider is eliminated, yielding an increase in user efficiency.

What is claimed is:

1. A system having a dual system interface apparatus for allowing a Public Switched Telephone Network [PSTN] telephony system and a cellular wireless telephony system to be simultaneously operable while connected to the same residential wiring wherein the apparatus includes automatic best economic session logic and emergency dialing logic comprising:
    a primary and secondary circuit transposer placed between a main PSTN line and each Plain Old Telephone service [POTs] device attached to said main PSTN line such that said primary circuit of each of said POTs devices appears on said secondary circuit of said main PSTN line;
    a first port of a dual system interface attached to said primary circuit of said main PSTN line;
    a second port of said dual system interface attached to said secondary circuit of said main PSTN line;
    a cellular wireless telephony device to connected to a third port of said dual system interface, said cellular wireless telephony device communicating with a wireless telephony system such that each of said POTs devices and said cellular wireless telephony device are simultaneously operable; and
    the apparatus having stored therein one or more machine instructions for routing emergency messages according to the emergency dialing logic.

2. The apparatus of claim 1 where the dual system interface is part of a CPE.

3. The apparatus of claim 2 where said CPE is a Plain Old Telephone service [POTs] device.

4. The apparatus of claim 2 where said CPE is a cordless radio frequency telephone device.

5. The apparatus of claim 1 where the dual system interface is part of a Telephone Adjunct Device [TAD].

6. The apparatus of claim 1 where a user may select any of the simultaneously operable telephony devices connected to any of a plurality of simultaneously operable communication mediums to use for sending or receiving a particular telephony communications session.

7. The apparatus of claim 1 where in the dual system interface, the third port includes a hardwired wireless cellular telephone device adapter.

8. The apparatus of claim 7 where in the hard-wired wireless cellular telephone device adapter said hard-wired wireless cellular telephone device adapter further includes a standard RJ-11 telephone connector, said R-11 telephone connector interfaced directly to said hard-wired wireless cellular telephone device adapter such that communications data transiting a wireless cellular telephone device connected to said hard-wired wireless cellular telephone device adapter are continuously and simultaneously present on said RJ-11 telephone connector.

9. The apparatus of claim 1 where in the dual system interface, the third port includes a local wireless cellular telephone device interface such that communications data to or from a wireless cellular telephone device transit said local wireless cellular telephone device interface.

10. The apparatus of claim 1 where in the dual system interface, the third port includes an infrared light beam interface such that communications data to or from a wireless cellular telephone device transit said infrared light beam interface.

11. A method for automatically selecting the most economical communications transmission medium for sending a particular communications session from among a plurality of communication mediums connected to a plurality of simultaneously operable communications devices sharing standard residential telephone wiring, wherein said method is contained within Telephone Adjunct Device, comprising:
  entering a predetermined signal into a control module;
  fetching economic decision data from a memory if said predetermined signal is detected by said control module;
  analyzing said economic decision data to determine the most economical communications medium for a particular instance of said economic decision data;
  selecting said most economical communications medium from among a plurality of communications mediums based upon the result of said analyzing of said economic decision data; and
  enabling the sending of telephony communications using said most economical communications medium by causing a communications circuit to be established over one of a plurality of possible communications,
  the analyzing including at least
    determining whether long distance charges are associated with a phone transmission; and
  the selecting including at least
    if the determining of whether the long distance charges are associated with the phone transmission, determines that the long distance charges are associated with the phone transmission, selecting the cell phone communications medium as the most economical communication medium.

12. A method for automatically selecting the most economical communications transmission medium for sending a particular communications session from among a plurality of communication mediums connected to a plurality of simultaneously operable communications devices sharing standard residential telephone wiring wherein said method is contained within Telephone Adjunct Device, comprising:
  entering a predetermined signal into a control module;
  fetching economic decision data from a memory if said predetermined signal is detected by said control module;
  analyzing said economic decision data to determine the most economical communications medium for a particular instance of said economic decision data;
  selecting said most economical communications medium from among a plurality of communications mediums based upon the result of said analyzing of said economic decision data; and
  enabling the sending of telephony communications using said most economical communications medium by causing a communications circuit to be established over one of a plurality of possible communications circuits,
  the analyzing including at least
    determining whether free phone minutes are available at a current time associated with a phone transmission,
    determining whether long distance charges are associated with the phone transmission; and
  the selecting including at least
    if the determining of whether the free phone minutes are available, determines the free phone minutes are available at the current time associated with phone transmission, selecting a medium associated with the free phone minutes, and
    if the determining of whether the free phone minutes are available, determines the free phone minutes are not available at the current time, and if the determining of whether the long distance charges are associated with the phone transmission, determines that the long distance charges are associated with the phone transmission, selecting the cell phone communications medium as the most economical communication medium.

13. A method for automatically selecting the most economical communications transmission medium for sending a particular communications session from among a plurality of communication mediums connected to a plurality of simultaneously operable communications devices sharing standard residential telephone wiring, wherein said method is contained within Telephone Adjunct Device, comprising:
  entering a predetermined signal into a control module;
  fetching economic decision data from a memory if said predetermined signal is detected by said control module;
  analyzing said economic decision data to determine the most economical communications medium for a particular instance of said economic decision data;
  selecting said most economical communications medium from among a plurality of communications mediums based upon the result of said analyzing of said economic decision data; and
  enabling the sending of telephony communications using said most economical communications medium by causing a communications circuit to be established over one of a plurality of possible communications circuits,
  the method further comprising:
  determining whether a phone transmission is an emergency phone transmission;
  if the phone transmission is determined to be an emergency phone transmission, routing the phone transmission according to an emergency routing logic.

14. A method for automatically selecting the most economical communications transmission medium for sending a particular communications session from among a plurality of communication mediums connected to a plurality of simultaneously operable communications devices sharing standard residential telephone wiring, wherein said method is contained within Telephone Adjunct Device, comprising:
  entering a predetermined signal into a control module;
  fetching economic decision data from a memory if said predetermined signal is detected by said control module;
  analyzing said economic decision data to determine the most economical communications medium for a particular instance of said economic decision data;
  selecting said most economical communications medium from among a plurality of communications mediums based upon the result of said analyzing of said economic decision data; and enabling the sending of telephony communications using said most economical communications medium by causing a communications circuit to be established over one of a plurality of possible communications circuits, the method further comprising:

determining whether a phone transmission is an emergency phone transmission;

if the phone transmission is determined to be an emergency phone transmission, routing the phone transmission to a Plain Ordinary Telephone Service (POTS) device without regard for economic considerations.

15. A method for automatically selecting the most economical communications transmission medium for sending a particular communications session from among a plurality of communication mediums connected to a plurality of simultaneously operable communications devices sharing standard residential telephone wiring wherein said method is contained within Telephone Adjunct Device, comprising:

entering a predetermined signal into a control module;

fetching economic decision data from a memory if said predetermined signal is detected by said control module;

analyzing said economic decision data to determine the most economical communications medium for a particular instance of said economic decision data;

selecting said most economical communications medium from among a plurality of communications mediums based upon the result of said analyzing of said economic decision data; and enabling the sending of telephony communications using said most economical communications medium by causing a communications circuit to be established over one of a plurality of possible communications circuits, the method further comprising:

if an emergency call is being made, determining whether a Plain Ordinary Telephone Service (POTS) phone is off the hook if the POTS phone is off the hook, the method returns to POTS operations if the POTS phone is not off the hook, determining whether an auxiliary POTS phone is off the hook, if the auxiliary POTS phone is off the hook,
a signal is sent to a first switch, and
the method returns to POTS operations if the auxiliary POTS phone is not off the hook, exiting the call manager process, if the call is not an emergency call, determining whether a cell phone is ready, if the cell phone is ready, determining whether a switch signal is sent, if the switch signal is sent, the method returns to performing the economic analysis, if the signal is not sent, the method returns to performing POTS operations, if the cell phone is not ready, determining whether the auxiliary POTS phone is off the hook, if the auxiliary cell phone is off the hook
sending a signal to the first switch, and
the method returns to the POTs operations if the auxiliary cell phone is not off the hook, the method returns to POTS operations.

16. A method for automatically selecting the most economical communications transmission medium for sending a particular communications session from among a plurality of communication mediums connected to a plurality of simultaneously operable communications devices sharing standard residential telephone wiring, wherein said method is contained within Telephone Adjunct Device comprising:

entering a predetermined signal into a control module;

fetching economic decision data from a memory if said predetermined signal is detected by said control module;

analyzing said economic decision data to determine the most economical communications medium for a particular instance of said economic decision data:

selecting said most economical communications medium from among a plurality of communications mediums based upon the result of said analyzing of said economic decision data; and enabling the sending of telephony communications using said most economical communications medium by causing a communications circuit to be established over one of a plurality of possible communications circuits, the method further comprising:

determining whether a time of day check is enabled,
if a time of day check is enabled,
the user entering time of day information, determining whether a signal check is enabled,
if a signal check is enabled, the user entering signal information, determining whether a long distance check is enabled,
if a long distance check is enabled, the user entering long distance information, and determining whether a minutes available check is enabled,
if a minutes available check is enabled, the user entering minutes available information.

17. A system comprising:

(I) residential wiring including at least a primary line and a secondary line;

(II) a plurality of communication devices connected to the residential telephone wiring, the plurality of communications devices including at least one or more POTs devices and one or more cell phones;

(III) one or more RJ-11 devices;

(IV) one or more transposers, each of the one or more transposers connecting a primary input circuit and a secondary input circuits of the one or more POTs devices, each of the one or more transposers connecting one POTs device to one RJ-11 device, via the secondary line, each of the one or more RJ-11 devices connecting to the secondary line of the residential telephone wiring;

(V) at least one base station, the base station including at least (A) a memory device including machine memory storing program code including at least (1) digital integrated answering software having at least one or more machine instructions for causing voice messages to be recorded if an incoming call is not answered, (2) switch logic having at least program code having at least one or more machine instructions for (a) monitoring the system and (b) making economic decisions about which of the plurality of communications devices is best for a particular communications session, by at least monitoring a number of variables the monitoring including at least (i) checking whether the call is long distance, (ii) checking a time-of-day of the call, and (iii) checking current communications conditions including at least
a cellular signal strength, and
free airtime minutes available from a cellular provider, (3) a call manager including at least program code for
  (a) monitoring all devices attached to the residential wiring,
  (b) determining which, if any, of the devices is active, and
  (c) directing traffic to the appropriate device in response to the current communications conditions,
  (d) one or more machine instructions for routing emergency calls, which forces emergency calls to be routed to a POTs device rather than a cell phone,
(4) control software for controlling the base stations, the control software including at least machine instructions for
  (a) power management,
  (b) housekeeping, and
  (c) diagnostics, and
(5) a wireless network protocol stack including at least program code having one or more machine instructions for operating a local wireless network,
(B) a hardware device communicatively connected to the memory device, the hardware device including at least
  (1) a microprocessor communicatively attached to the memory device,
  (2) an input/output device communicatively attached to the microprocessor,
(C) a dual system interface for interfacing with at least one landline telephone and at least one wireless telephone, the dual system interface including at least
  (1) a line switching device that switches between a landline and a wireless line, directing traffic for a particular communications session to an appropriate device, the line switching device being attached to the input/output device, the line switching device physically connects and disconnects devices to a PSTN under control of the switch logic and the control software,
  (2) a cell phone dock interface, formed in a chassis of the base station, communicatively coupled to the line switching device and the input/output device, the cell phone dock interface being configured for interfacing with a plurality of types of cell phones, the cell phone dock interface, including at least
    (a) a socket or cradle for a cell phone
    (b) a cellular wireless interface
    (c) a cell phone adaptor connected to the cellular wireless interface
    (d) an analog interface, and
    (e) an RJ-11 device connected to the cellular wireless interface,
  (3) a local wireless network interface device attached to the line switching device and the input/output device, the local wireless network interface device having a local wireless interface to the cell phone, including at least an (a) antenna for transmitting signals to the cell phone under control of
    (b) machine instructions of the Wireless Network Protocol Stack;
(VI) a cell device attached to the cell phone dock interface device, the cell phone dock interface is hard-wired interface for interfacing with the cell device; and
(VII) an auxiliary POTs device communicatively attached to the cell phone dock interface device, the cell phone dock interface is hard-wired interface for interfacing with the auxiliary POTs device, the auxiliary POTs device enabling communications over the cellular wireless network without switching lines or removing the cell phone from the base station.

18. The system of claim 17, the line switching device including at least two double-pole, double-throw switches.

* * * * *